United States Patent
Patel et al.

(10) Patent No.: US 9,705,658 B2
(45) Date of Patent: Jul. 11, 2017

(54) METHOD AND APPARATUS FOR DETECTING INCONSISTENT CONTROL INFORMATION IN WIRELESS COMMUNICATION SYSTEMS

(71) Applicant: MBIT WIRELESS, INC., Newport Beach, CA (US)

(72) Inventors: Bhaskar Patel, San Clemente, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 263 days.

(21) Appl. No.: 14/170,987

(22) Filed: Feb. 3, 2014

(65) Prior Publication Data

US 2014/0219196 A1 Aug. 7, 2014

Related U.S. Application Data

(60) Provisional application No. 61/760,167, filed on Feb. 4, 2013.

(51) Int. Cl.
*H04L 5/00* (2006.01)

(52) U.S. Cl.
CPC .......... *H04L 5/0091* (2013.01); *H04L 5/0048* (2013.01); *H04L 5/0053* (2013.01)

(58) Field of Classification Search
CPC .... H04L 5/0048; H04L 5/0053; H04L 5/0091
USPC ......................................... 370/252, 310, 329
See application file for complete search history.

(56) References Cited

U.S. PATENT DOCUMENTS

| | | | | |
|---|---|---|---|---|
| 2010/0254329 A1* | 10/2010 | Pan | .......................... | H04L 5/001 370/329 |
| 2010/0279628 A1* | 11/2010 | Love | ..................... | H04L 5/0091 455/70 |
| 2013/0003569 A1* | 1/2013 | Lindoff | ................. | H04L 1/0045 370/252 |
| 2013/0058240 A1* | 3/2013 | Kim | ..................... | H04L 5/0007 370/252 |
| 2013/0205176 A1* | 8/2013 | Qian | ..................... | H04L 1/0038 714/704 |
| 2014/0321406 A1* | 10/2014 | Marinier | ................ | H04B 7/024 370/329 |

* cited by examiner

*Primary Examiner* — Mang Yeung
*Assistant Examiner* — Natali N Pascual Peguero
(74) *Attorney, Agent, or Firm* — Lerner, David, Littenberg, Krumholz & Mentlik, LLP

(57) ABSTRACT

In order to support low latency and bursty internet data traffic, the 3GPP LTE wireless communication system uses dynamic allocation. To keep the allocation overhead lower, the system is designed such that the client terminal must perform a number of decoding attempts to detect resource allocations. During course of the decoding attempts a false resource allocation may be decoded by the client terminal. The false detection may lead to multiple issues for the performance efficiency of the client terminal and the overall communication system. A method and apparatus are disclosed than enable the detection of false resource allocation. This in turn improves the performance and efficiency of the client terminal and the wireless communication system.

9 Claims, 20 Drawing Sheets

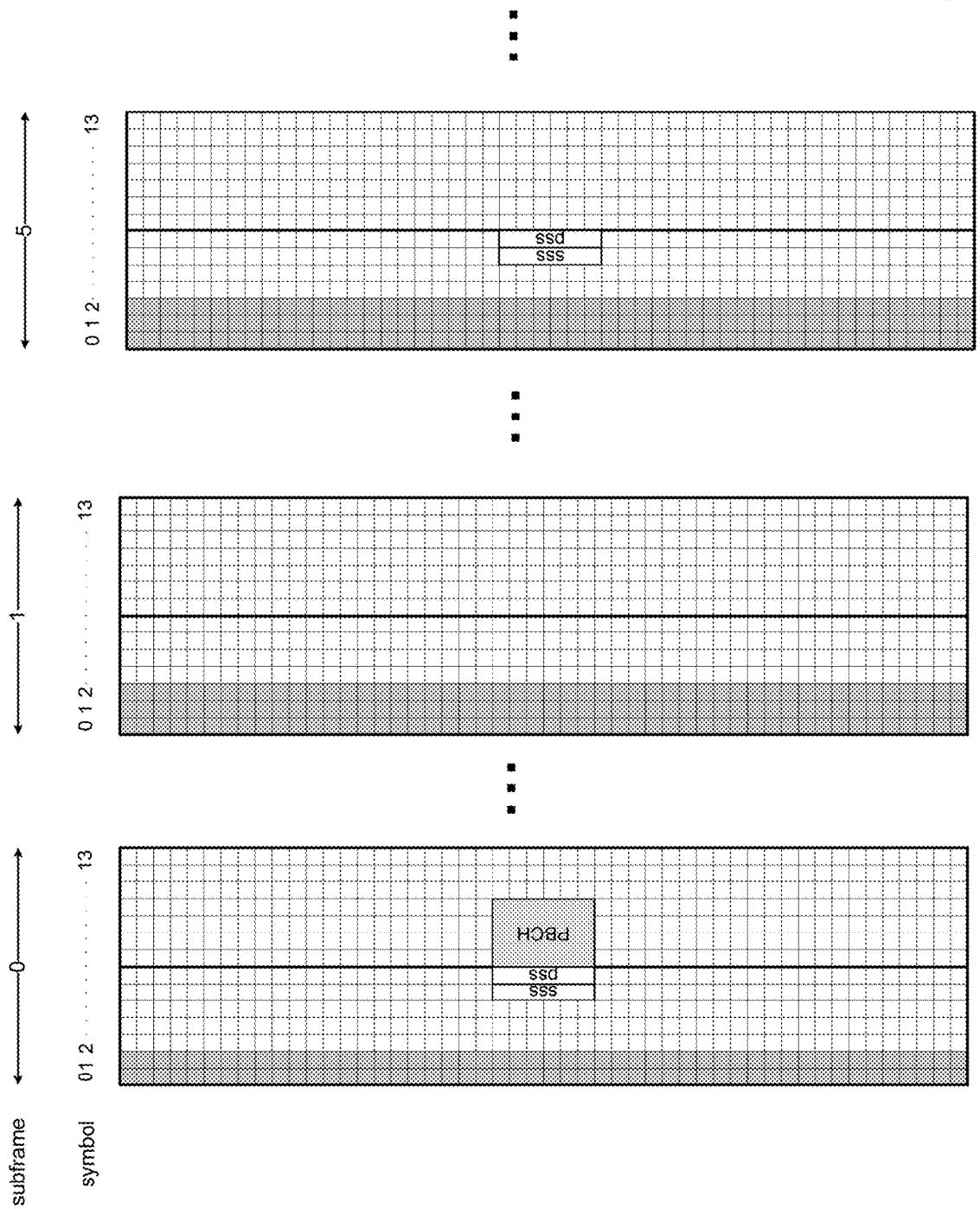

| Search space type | Aggregation Level | Size [in CCEs] | Number of PDCCH candidates |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

FIG. 7

| S.No | TDD configuration | DCI-0s are not allowed in DL SFs |
|---|---|---|
| 1 | 0 | - |
| 2 | 1 | 0,5 |
| 3 | 2 | 0,1,4,5,6,9 |
| 4 | 3 | 1,5,6,7 |
| 5 | 4 | 0,1,4,5,6,7 |
| 6 | 5 | 0,1,3,4,5,6,7,9 |
| 7 | 6 | - |

FIG. 9

| "Reception Type" | Physical Channel(s) | Monitored RNTI | Associated Transport Channel |
|---|---|---|---|
| A | PBCH | N/A | BCH |
| B | PDCCH+PDSCH | SI-RNTI | DL-SCH |
| C | PDCCH+PDSCH | P-RNTI | PCH |
| D | PDCCH+PDSCH | RA-RNTI (Note 3) | DL-SCH |
|   |   | Temporary C-RNTI (Note 3) (Note 4) | DL-SCH |
|   |   | C-RNTI and Semi-Persistent Scheduling C-RNTI | DL-SCH |
| E | PDCCH (Note 1) | C-RNTI | N/A |
| F | PDCCH | Temporary C-RNTI (Note 5) | UL-SCH |
|   |   | C-RNTI and Semi-Persistent Scheduling C-RNTI | UL-SCH |
| G | PDCCH | TPC-PUCCH-RNTI | N/A |
| H | PDCCH | TPC-PUSCH-RNTI | N/A |
| I | PDCCH | Semi-Persistent Scheduling C-RNTI (Note 6) | N/A |
| J | PDCCH | Semi-Persistent Scheduling C-RNTI (Note 7) | N/A |

Note 1: PDCCH is used to convey PDCCH order for Random Access.
Note 2: Void.
Note 3: RA-RNTI and Temporary C-RNTI are mutually exclusive and only applicable during Random Access procedure.
Note 4: Temporary C-RNTI is only applicable when no valid C-RNTI is available.
Note 5: Temporary C-RNTI is only applicable during contention-based Random Access procedure.
Note 6: Semi-Persistent Scheduling C-RNTI is used for DL Semi-Persistent Scheduling release.
Note 7: Semi-Persistent Scheduling C-RNTI is used for UL Semi-Persistent Scheduling release.

FIG. 10
(Prior Art)

| TDD UL/DL configuration | Maximum number of HARQ processes | Number of HARQ processes for normal HARQ operation | Number of HARQ processes for subframe bundling |
|---|---|---|---|
| 0 | 4 | 7 | 3 |
| 1 | 7 | 4 | 2 |
| 2 | 10 | 2 | N/A |
| 3 | 9 | 3 | N/A |
| 4 | 12 | 2 | N/A |
| 5 | 15 | 1 | N/A |
| 6 | 6 | 6 | 3 |

FIG. 12

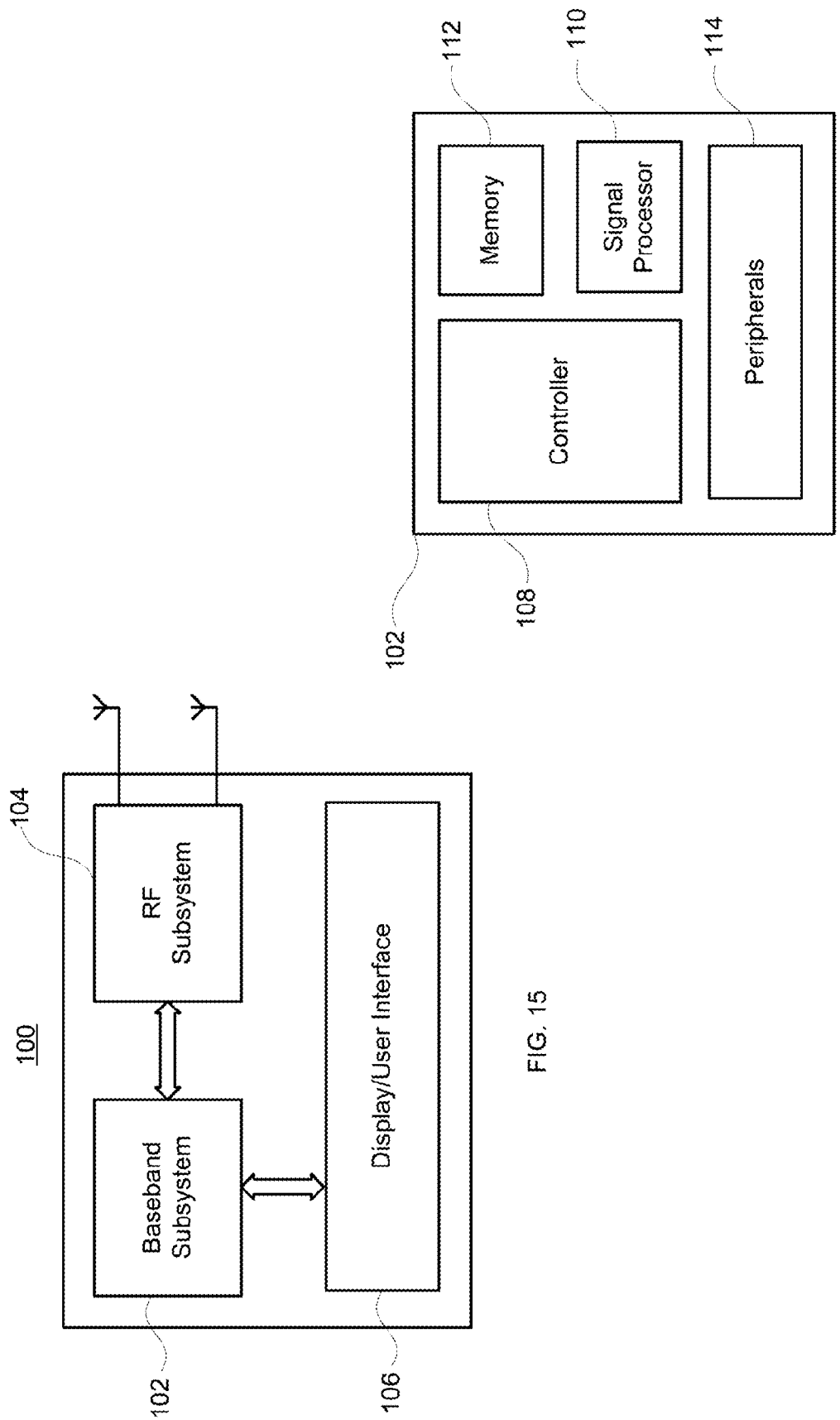

METHOD AND APPARATUS FOR DETECTING INCONSISTENT CONTROL INFORMATION IN WIRELESS COMMUNICATION SYSTEMS

CROSS-REFERENCE TO RELATED APPLICATIONS

This application claims the benefit of the filing date of U.S. Provisional Application No. 61/760,167 filed Feb. 4, 2013 and entitled "METHOD AND APPARATUS FOR DETECTING INCONSISTENT CONTROL INFORMATION IN LTE DOWNLINK CONTROL CHANNEL," the entire disclosure of which is hereby expressly incorporated by reference herein.

BACKGROUND OF THE INVENTION

The present invention relates generally to wireless communication systems and, more particularly, to mobile station receiver architectures and methods that employ decoding multiple hypotheses such as in case of 3rd Generation Partnership Project ("3GPP") Long Term Evolution ("LTE") wireless communication system.

As shown in FIG. 1, a wireless communication system 10 comprises elements such as a client terminal or mobile station 12 and base stations 14. Other network devices which may be employed, such as a mobile switching center, are not shown. As illustrated, the communication path from the base station ("BS") to the client terminal direction is referred to herein as the downlink ("DL") and the communication path from the client terminal to the base station direction is referred to herein as the uplink ("UL"). In some wireless communication systems the client terminal or mobile station ("MS") communicates with the BS in both DL and UL directions. For instance, this is the case in cellular telephone systems. In other wireless communication systems the client terminal communicates with the base stations in only one direction, usually the DL. This may occur in applications such as paging.

Most wireless communication systems have an overhead in terms of managing and controlling the wireless link between the network and the client terminal. A number of beacon signals may need to be transmitted by the base station that enables the client terminal to detect the base station and synchronize to it. For example, in LTE wireless communication system the Primary Synchronization Signal ("PSS"), the Secondary Synchronization Signal ("SSS"), and Physical Broadcast Channel ("PBCH") are used to enable the client terminal to detect and synchronize to the base station. Even after the client terminal detects and synchronizes with the base station, it needs additional information about the detailed structure of the channel and various parameters required for communication with the base station in both DL and UL. This information is generally referred to as "System Information." Depending on the particular wireless communication system, the base station may transmit the System Information in one or more smaller independent units of information.

Even after the client terminal has detected the base station, synchronized to it and had decoded the System Information, it does not have any specific resources allocated to it for communication. For this purpose, it has to first transmit a signal in UL to request resources in DL, UL, or both. In many wireless communication systems, multiple client terminals use the same resources for communication. The base station manages the overall allocation of the resources to the multiple client terminals contending for the same shared channel. While making resource allocation decisions, the base station considers a number of factors such as the required bit rate, latency, quality of service required, bit error rate, channel conditions, the loading of the cell in terms of number of active users, etc. Furthermore, these factors vary continuously and the base station adapts its decisions dynamically.

Conventional wireless communication systems are primarily used for voice calls and text messaging. The resource allocation for a voice can be done once and then it does not change for a relatively long time. For example, average phone call duration may be in the order of minutes. Similarly, text messaging may be much less frequent. The latency in allocation of resources for setting up a voice call is usually in the order of several seconds. This latency is generally acceptable to the users since it is a onetime latency during the call setup. After the call is setup the allocated channel resources are dedicated to the user for the duration of the call. Another part of the resource allocation is the overhead incurred in the process of allocating the resources. For example, number and size of control messages required to establish a phone call may be significant. However, the call setup overhead due to control message is a small percentage of the duration of the call since the overhead is incurred only once per call.

Over the years, the use of the internet has increased over the wireless communication networks. Normally the traffic pattern of internet usage is very bursty, e.g., the request for resources comes very frequently but each request is only for a short duration of time. Under such traffic conditions the latency of several seconds in the conventional wireless communication systems may not be acceptable. Therefore, one requirement is to have a resource allocation method that can allocate resources with low latency. Another requirement is that the allocation of the resources must incur low overhead since the allocation, release and reallocation of resources occur much more frequently.

The LTE wireless communication system is designed for low latency and high throughput applications. Examples of such applications include the web browsing, mobile online gaming, video calls, media streaming, etc. Supporting such applications requires the allocation of resources in a dynamic manner. This is in contrast with respect to the previous generation wireless communication systems that are designed for allocations that do not change for tens of seconds and even minutes and hours. In LTE wireless communication system, the resource allocation may change once every millisecond.

The potential penalty for such dynamic resource allocation may be that the overhead for allocating the resources is incurred every millisecond. To keep the overhead of resource allocation low while keeping the resource allocation dynamic and the latency low, the LTE wireless communication system employs several techniques.

The LTE wireless communication system employs Orthogonal Frequency Division Multiple Access ("OFDMA") technology in the DL air interface. The basics of OFDMA are described in "4G LTE/LTE-Advanced for Mobile Broadband" by Dahlman, Erik, et al., copyright 2011 and published by Academic Press, MA, the entire disclosure of which is hereby expressly incorporated by reference herein. The high level structure of the LTE DL air interface, as described in 3GPP TS 36.211: "Evolved Universal Terrestrial Radio Access ("E-UTRA"); Physical channels and modulation," is shown in FIG. 2. The air interface consists of series of frames of 10 ms each and each frame consists of 10 subframes with 1 ms per subframe. As shown in FIG. 3 each subframe in turn consists of 12 or 14 OFDM symbols depending on the length of Cyclic Prefix ("CP") used. The FIG. 3 shows the structure for Normal CP with 14 OFDM symbols per subframe for the case of 10 MHz channel bandwidth with 50 Resource Blocks ("RBs"). FIG. 3A focuses on certain subframes from FIG. 3 for clarity purposes.

The first few OFDM symbols of each subframe are used for control channel purposes and it is called Control Region as shown in FIG. 3. A control channel, called Physical Downlink Control Channel ("PDCCH") is designed for the purpose of dynamic resource allocation. The payload data describing the resource allocation information that is transmitted using PDCCH is called Downlink Control Information ("DCI"). The DCI describes the allocation of the resources in the remaining portion of the subframe call Data region.

The PDCCH is transmitted within the control region of each subframe. The number of OFDM symbols used for the control region may vary from one subframe to another. The actual number of OFDM symbols used for a subframe is given by another control channel called Physical Control Format Indicator Chanel ("PCFICH"). The PCFICH is always transmitted in the first OFDM symbol of each subframe. The number of control symbols in each subframe is at least one OFDM symbol. Each PDCCH allocates resources for one client terminal in either DL or UL. Therefore, there may be multiple PDCCHs in the control region.

In LTE wireless communication systems the base station is referred as Enhanced Node B ("eNB"). One of the requirements from eNB in LTE wireless communication systems is the flexibility in addressing (sending resource allocation to) a particular client terminal through the PDCCH. This flexibility in turn requires the client terminal to search all the possible PDCCH candidates within different parts of the control region in each subframe, as shown in FIG. 3, for possible resource allocation to it. In any given subframe, there may or may not be any resource allocation for a particular client terminal. The allocation for DL and UL are provided separately since the internet traffic pattern in general may be asymmetric. Therefore, in a single subframe there may be zero, one or two PDCCHs transmitted by the base station to a particular client terminal. In some special conditions, there may be more than two PDCCHs transmitted to a particular client terminal in a single subframe.

To keep the allocation overhead low, the PDCCH may be transmitted with different level of Forward Error Correction ("FEC"). This is referred to as Aggregation Level ("AL") in LTE wireless communication systems. Depending on the expected signal conditions of the client terminal to which the PDCCH is transmitted, the base station may dynamically use a different AL. However, the client terminal may not be a priori aware of the AL used by the base station. The AL used for different client terminals may be different. A Control Channel Elements ("CCE") consists of 72 transmission bits (coded bits after FEC) and it is a basic allocation unit for PDCCH transmission within a subframe. Each aggregation level uses one or more CCEs within the control region of a subframe. There are total of four different aggregation levels used in LTE wireless communication systems as shown in FIG. 4, employing 1, 2, 4, and 8 CCEs with 72, 144, 288 and 576 transmission bits respectively.

In LTE wireless communication systems different formats for the DCI messages are used for handling different allocation requirements. For example, DL allocation and UL allocation messages may have different types of information. In LTE wireless communication systems different multi-antenna transmission modes are used. Depending on the particular transmission mode used the type and length of the DCI messages may vary. At any given time, a UE (user equipment) is required to decode DCI messages of at most two possible different lengths.

Considering all the above factors, the PDCCH AL, the length of the DCI message and all the possible PDCCHs that may be transmitted by the base station, the client terminal has to perform PDCCH decoding with a number of different combinations. This is often referred to as blind PDCCH decoding.

In LTE wireless communication systems different UEs are identified using various identities known Radio Network Temporary Identifier ("RNTI") which is unique within a cell. There are some RNTIs that are broadcast type which address all the UEs in a cell whereas there are other RNTIs that address a particular client terminal. Each client terminal is assigned a unique RNTI within the cell when it first camps on a cell. In a PDCCH, a particular client terminal is addressed by the eNB by using the RNTI for that client terminal. However, in order to keep the overhead low, the RNTI is not explicitly added to the DCI payload.

A concept of search space is used in LTE wireless communication systems to reduce the number of PDCCH candidates that a client terminal must decode in each subframe. The search space is divided into two parts: Common Search Space ("CSS") and UE Specific Search Space ("UESSS"). The PDCCHs with broadcast RNTIs may be transmitted only in the CSS whereas the PDCCH with UE specific RNTI may be transmitted in either the CSS or UESSS. The CSS is common to all the UEs that are camped on a cell. The UESSS is derived from the UE specific RNTI. Within the control region of each subframe, the UE only searches within the CSS and its UESSS for possible PDCCHs being transmitted to it. The specific CCEs to which a particular PDCCH is mapped to is a function of the search space, aggregation level and the RNTI of the UE in case of UESSS. For the CSS, the PDCCHs are always mapped to the first 16 CCEs as shown in FIG. 5. The mapping of the UESSS PDCCH candidates depends on its RNTI and an example of that is shown in FIG. 6. The summary of the PDCCH candidates a UE is required search under normal operation is summarized in the table contained in FIG. 7. Considering all the PDCCH candidates and two different DCI lengths, total of 44 blind PDCCH decoding attempts may be required in each subframe.

In addition to the FEC, error detection is used for PDCCH to enable the client terminal to ensure whether the PDCCH decoding is successful or not. The error detection is performed using a 16-bit Cyclic Redundancy Check ("CRC"). The RNTI of the client terminal to which the PDCCH is addressed is XOR-ed with the computed CRC over the DCI payload as shown in FIG. 8. The intended RNTI may be a broadcast RNTI or client terminal specific RNTI.

During the course of blind PDCCH decoding the client terminal must match the locally computed CRC against one of the broadcast RNTIs or its assigned unique RNTIs. Only when the XOR-ed CRC match, a PDCCH decoding is considered successful.

During blind PDCCH decoding in the client terminal, the input to the PDCCH decoder may be from an actual signal transmitted by eNB or from some random values from parts of the downlink signal. This may be because the eNB may not be transmitting any information at all or may be transmitting information intended for other client terminals. Only few (typically two or three) of the 44 blind decoding attempts may have a useful signal transmitted by eNB intended for the particular client terminal as input to the PDCCH decoder. The probability that a random 16-bit pattern matches the true CRC for the payload portion of the data is $1/2^{16}$. When a computed CRC on the received PDCCH matches the received CRC when there was no PDCCH transmitted, it is defined as a false PDCCH decoding. Considering that there are 44 blind decoding attempts made by the client terminal per subframe, the probability of getting a false PDCCH decoding per subframe is $44*(1/2^{16})$. Furthermore, the PDCCH CRC is checked in conjunction multiple RNTIs that may be used by the client terminal. Assuming that on average two identifiers may be used by the client terminal at any given time, the probability of false PDCCH detection may be increased further by a factor of two, i.e., $2*44*(1/2^{16})$. Since there are 1000 subframes in one second, the probability of getting one false PDCCH per second is $1000*2*44*(1/2^{16})$. This translates to about a 134% chance of one false PDCCH decoding per second. This means that at least one false PDCCH is likely to occur every second. When a UE is required to decode PDCCH with additional RNTIs such as SI-RNTI or SPS-RNTI, the probability of false PDCCH detection is further increased.

The false PDCCH decoding may lead to false DCI which in turn leads to false resource allocation in the client terminal. Such false PDCCH detection may cause two types of problems. If the false PDCCH detection is related to downlink resource allocation then it may cause the client terminal to receive the downlink data that does not actually contain any information for that particular client terminal. This results in unnecessary power consumption in the client terminal. Furthermore, if there was another allocation in the same subframe that was actually intended for the client terminal there may be conflict in the allocated resources. This may cause the client terminal to behave in an unpredictable manner and could result in the client terminal not receiving the data that was intended for it. For the uplink direction, the false detection of the PDCCH may result in the client terminal transmitting on resources that are not granted to it. This may cause interference to other client terminal which may be allocated those particular resources. This may lead to unnecessary power consumption on all the client terminals that may be transmitting on those particular resources. Furthermore, the bandwidth is wasted in both the downlink and the uplink of the wireless communication system.

The LTE wireless communication system uses Hybrid Automatic Repeat Request ("HARQ"). False PDCCH detection can also cause the HARQ Finite State Machine ("FSM") running at the client terminal and at the eNB to be out of sync. For each downlink resource allocation there is a corresponding HARQ acknowledgement in the uplink. The location of uplink acknowledgement is based on the start position of the PDCCH blind decoding candidate. The false PDCCH decoding then in turn leads to transmission of HARQ acknowledgment (positive or negative) in the uplink direction at the wrong location in uplink resources and possibly interfering with other client terminals that may be sending HARQ acknowledgements. The false PDCCH decoding may lead to a series of problems that compound over a period of few subframes.

Multiple successful PDCCH detection may occur when single set of PDCCH data is processed by the receiver in the client terminal assuming different message sizes and coding rates and AL. For example, it may be possible to successfully decode a message of the same size with different AL assumption. This leads to multiple successful decoding of a single PDCCH for a given client terminal. This is referred herein as duplicate PDCCH detection.

SUMMARY OF THE INVENTION

In accordance with aspects of the invention, a computer-implemented method of checking for false downlink control information in a wireless communication system is provided. The method comprises selecting one or more radio network temporary identifiers (RNTI) for which a physical downlink control channel (PDCCH) needs to be configured for a present operating mode of a client device; for every subframe, configuring, by one or more processors, the one or more selected RNTI into a PDCCH decoder; for every subframe, configuring a number of PDCCHs to be received for each configured RNTI to the PDCCH decoder; and performing PDCCH decoding using the PDCCH decoder.

In one example, the method further comprises limiting a maximum number of blind PDCCH decoding attempts based on an expected maximum number of successful PDCCHs in any given subframe. In another example, the method further comprises, after performing the PDCCH decoding, determining whether a cyclic redundancy check (CRC) of the decoded PDCCH matches any of the configured RNTI. Here, when the PDCCH CRC does not match with any of the configured RNTI, the method may further comprise determining whether to continue further PDCCH decoding based on whether a maximum number of PDCCH decoding attempts has been completed. Alternatively, when the PDCCH CRC matches with one of the configured RNTI, the method may further comprise incrementing the number of PDCCH decoded for the matching RNTI. In this case, the method may further comprises determining whether the configured number of PDCCHs for a given RNTI is decoded or not; when the configured number of PDCCHs for a given RNTI is not decoded yet, determining whether the maximum number of PDCCH decoding attempts has been completed; and when the configured number of PDCCHs for a given RNTI is decoded, removing from the list of configured RNTIs for the current subframe the RNTI for which the configured number of PDCCHs are decoded.

According to other aspects, a processing system configured to check for false downlink control information in a wireless communication network is provided. The system comprises memory configured to store information associated with one or more radio network temporary identifiers (RNTI) and one or more physical downlink control channels (PDCCH), and one or more processors. The processors are configured to select one or more RNTI for which a PDCCH needs to be configured for a present operating mode of a client device; for every subframe, configure the one or more selected RNTI into a PDCCH decoder; for every subframe, configure a number of PDCCHs to be received for each configured RNTI to the PDCCH decoder; and perform PDCCH decoding using the PDCCH decoder.

In one example, the one or more processors are further configured to: determine whether a cyclic redundancy check (CRC) of the decoded PDCCH matches any of the configured RNTI; when the PDCCH CRC does not match with any of the configured RNTI, determine whether to continue further PDCCH decoding based on whether a maximum number of PDCCH decoding attempts has been completed; and when the PDCCH CRC matches with one of the configured RNTI, incrementing the number of PDCCH decoded for the matching RNTI. In this case, the one or more processors may be further configured to: determine whether the configured number of PDCCHs for a given RNTI is decoded or not; when the configured number of PDCCHs for a given RNTI is not decoded yet, determine whether the maximum number of PDCCH decoding attempts has been completed; and when the configured number of PDCCHs for a given RNTI is decoded, remove from the list of configured RNTIs for the current subframe the RNTI for which the configured number of PDCCHs are decoded.

According to further aspects, a wireless communication device is configured to check for false downlink control information in a wireless communication network. The device comprises a transceiver, memory, a PDCCH decoder, and one or more processors. The transceiver is configured to receive downlink control information; memory configured to store information associated with one or more radio network temporary identifiers (RNTI) and one or more physical downlink control channels. The PDCCH decoder is configured to perform PDCCH decoding. And the one or more processors are operatively coupled to the transceiver, the memory and the PDCCH decoder. The one or more processors are configured to: select one or more RNTI for which a PDCCH needs to be configured for a present operating mode of a client device; for every subframe, configure the one or more selected RNTI into the PDCCH decoder; for every subframe, configure a number of PDCCHs to be received for each configured RNTI to the PDCCH decoder; and cause the PDCCH decoder to perform the PDCCH decoding.

In accordance with other aspects, a computer-implemented method of detecting false downlink control information in a wireless communication system is provided. The method comprises: determining, by one or more processors, whether a physical downlink control channel (PDCCH) candidate has been successfully decoded at a first aggregation level of a particular tree structure; when it is determined that the PDCCH candidate has been successfully decoded at the first aggregation level of the particular tree structure, skipping PDCCH candidates at a second, higher, aggregation level within the particular tree structure; performing, by the one or more processors, duplicate PDCCH detection; when the detection determines that the PDCCH candidate is not a duplicate, extracting a hybrid automatic repeat request (HARQ) process identity from a downlink control information (DCI) message; and determining whether the HARQ process identity is within an expected limit.

In one example, when the detection determines that the PDCCH candidate is a duplicate, the method declares the PDCCH candidate a duplicate and discarding it. In another example, performing the duplicate PDCCH detection includes checking whether a message is identical to another successfully decoded message of the same length. In a further example, performing the duplicate PDCCH detection includes checking whether a cyclic redundancy check (CRC) of a decoded PDCCH message is identical to the CRC of a previously decoded PDCCH message.

In yet another example, the method further comprises: extracting new data indicator (NDI) and modulation and coding scheme (MCS) fields from the DCI message; determining whether the extracted NDI field has toggled compared to an NDI value in a last received DCI for a same HARQ process identity; and when it is determined that the extracted NDI field has toggled, checking the value of the MCS field to determine whether it satisfies a predetermined threshold such that the received DCI is a true DCI. Here, the method may further comprise: when it is determined that the extracted NDI field has not toggled, determining whether the extracted MCS satisfies the predetermined threshold and whether any DCI for the same HARQ process identity was previously received with the same MCS value; and when the extracted MCS value and any DCI for the same HARQ process identity was previously received with the same MCS value, identifying the received DCI as the true DCI.

In accordance with further aspects of the invention, a processing system is configured to detect false downlink control information in a wireless communication network. The system comprises: memory configured to store information associated one or more physical downlink control channels (PDCCH) and one or more processors coupled to the memory. The one or more processors are configured to: determine whether a PDCCH candidate has been successfully decoded at a first aggregation level of a particular tree structure; when it is determined that the PDCCH candidate has been successfully decoded at the first aggregation level of the particular tree structure, skip PDCCH candidates at a second, higher, aggregation level within the particular tree structure; perform duplicate PDCCH detection; when the detection determines that the PDCCH candidate is not a duplicate, extract a hybrid automatic repeat request (HARQ) process identity from a downlink control information (DCI) message; and determine whether the HARQ process identity is within an expected limit.

In one example the one or more processors are further configured to: extract new data indicator (NDI) and modulation and coding scheme (MCS) fields from the DCI message; determine whether the extracted NDI field has toggled compared to an NDI value in a last received DCI for a same HARQ process identity; and when it is determined that the extracted NDI field has toggled, check the value of the MCS field to determine whether it satisfies a predetermined threshold such that the received DCI is a true DCI. In this case, the one or more processors may be further configured to: when it is determined that the extracted NDI field has not toggled, determine whether the extracted MCS satisfies the predetermined threshold and whether any DCI for the same HARQ process identity was previously received with the same MCS value; and when the extracted MCS value and any DCI for the same HARQ process identity was previously received with the same MCS value, identify the received DCI as the true DCI.

And in accordance with yet another aspect, a wireless communication device is configured to detect false downlink control information in a wireless communication network. The device comprises a transceiver configured to receive downlink control information; memory configured to store information associated with one or more physical downlink control channels (PDCCH); a PDCCH decoder configured to perform PDCCH decoding; and one or more processors operatively coupled to the transceiver, the memory and the PDCCH decoder. The one or more processors are configured to: determine whether a PDCCH candidate has been successfully decoded at a first aggregation level of a particular tree structure; when it is determined that the PDCCH candidate has been successfully decoded at the first aggregation level of the particular tree structure, skip PDCCH candidates at a second, higher, aggregation level within the particular tree structure; perform duplicate PDCCH detection; when the detection determines that the PDCCH candidate is not a duplicate, extract a hybrid automatic repeat request (HARQ) process identity from a downlink control information (DCI) message; and determine whether the HARQ process identity is within an expected limit.

In one example, the one or more processors are further configured to: extract new data indicator (NDI) and modulation and coding scheme (MCS) fields from the DCI message; determine whether the extracted NDI field has toggled compared to an NDI value in a last received DCI for a same HARQ process identity; and when it is determined that the extracted NDI field has toggled, check the value of the MCS field to determine whether it satisfies a predetermined threshold such that the received DCI is a true DCI. In this case, the one or more processors may be further configured to: when it is determined that the extracted NDI field has not toggled, determine whether the extracted MCS satisfies the predetermined threshold and whether any DCI for the same HARQ process identity was previously received with the same MCS value; and when the extracted MCS value and any DCI for the same HARQ process identity was previously received with the same MCS value, identify the received DCI as the true DCI.

BRIEF DESCRIPTION OF THE DRAWINGS

FIGS. 3 and 3A illustrate subframe level details for the air interface structure of the LTE wireless communication system.

FIG. 7 summarizes the PDCCH Candidates per Search Space and Aggregation Level.

FIG. 9 lists the subframes in which DCI for UL allocation may occur.

FIG. 10 lists the simultaneous parallel reception type required for UE of the LTE wireless communication system.

FIG. 12 lists the maximum number of HARQ processes for different ("Time Division Duplex") TDD configurations.

FIG. 15 illustrates a diagram of a wireless mobile station usable in accordance with aspects of the present invention.

FIG. 16 illustrates a diagram of a baseband subsystem for a wireless mobile station usable in accordance with aspects of the present invention.

DETAILED DESCRIPTION

Figure 1:
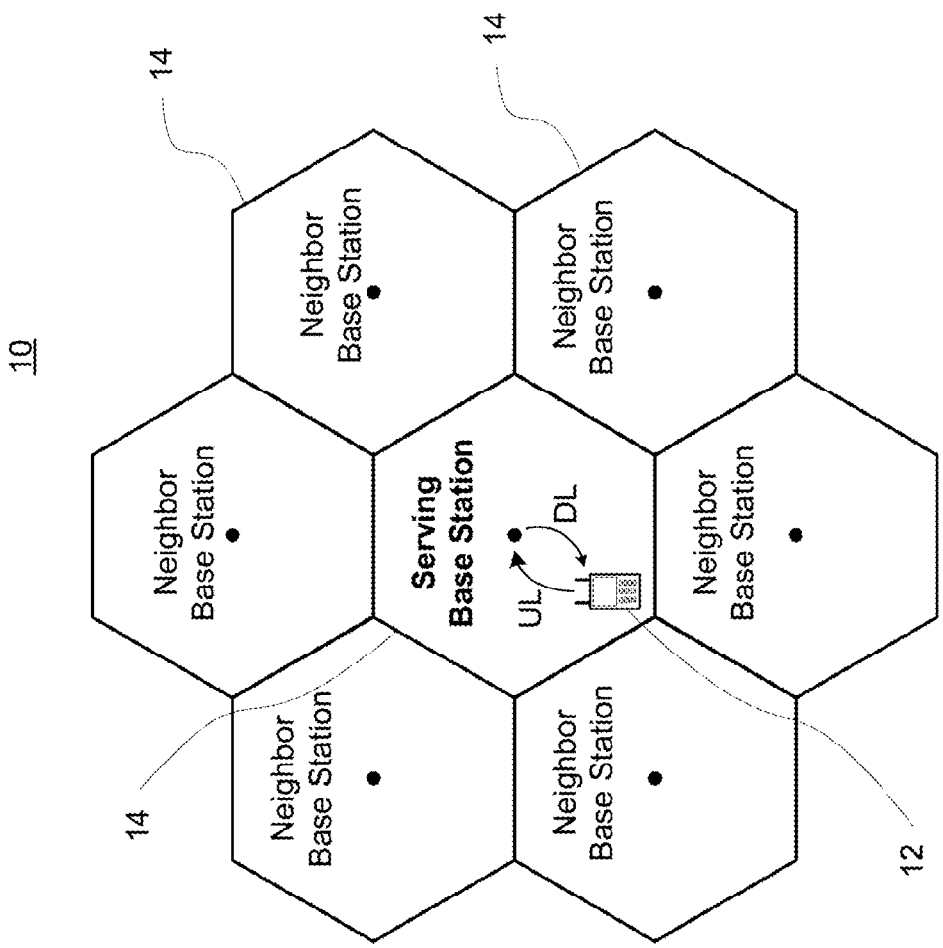
FIG. 1 illustrates a conventional cellular wireless communication system.
Figure 2:
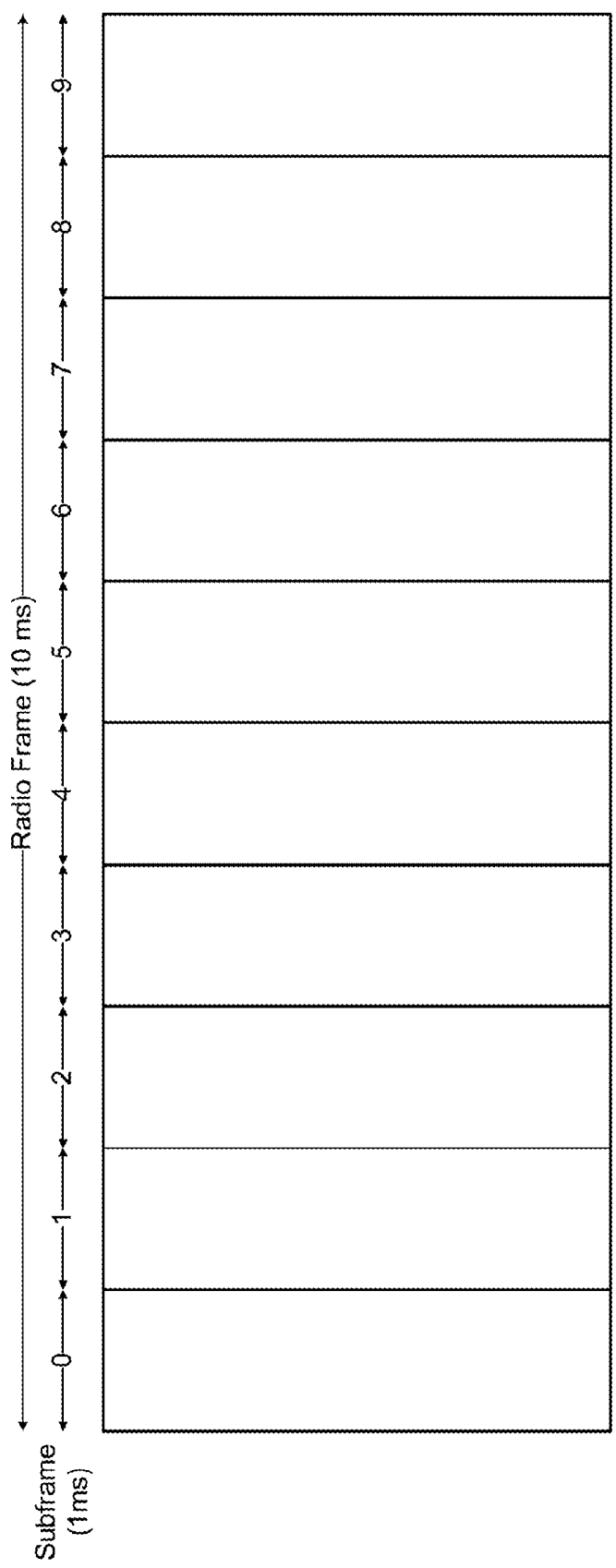
FIG. 2 illustrates a conventional wireless communication system.
Figure 3:
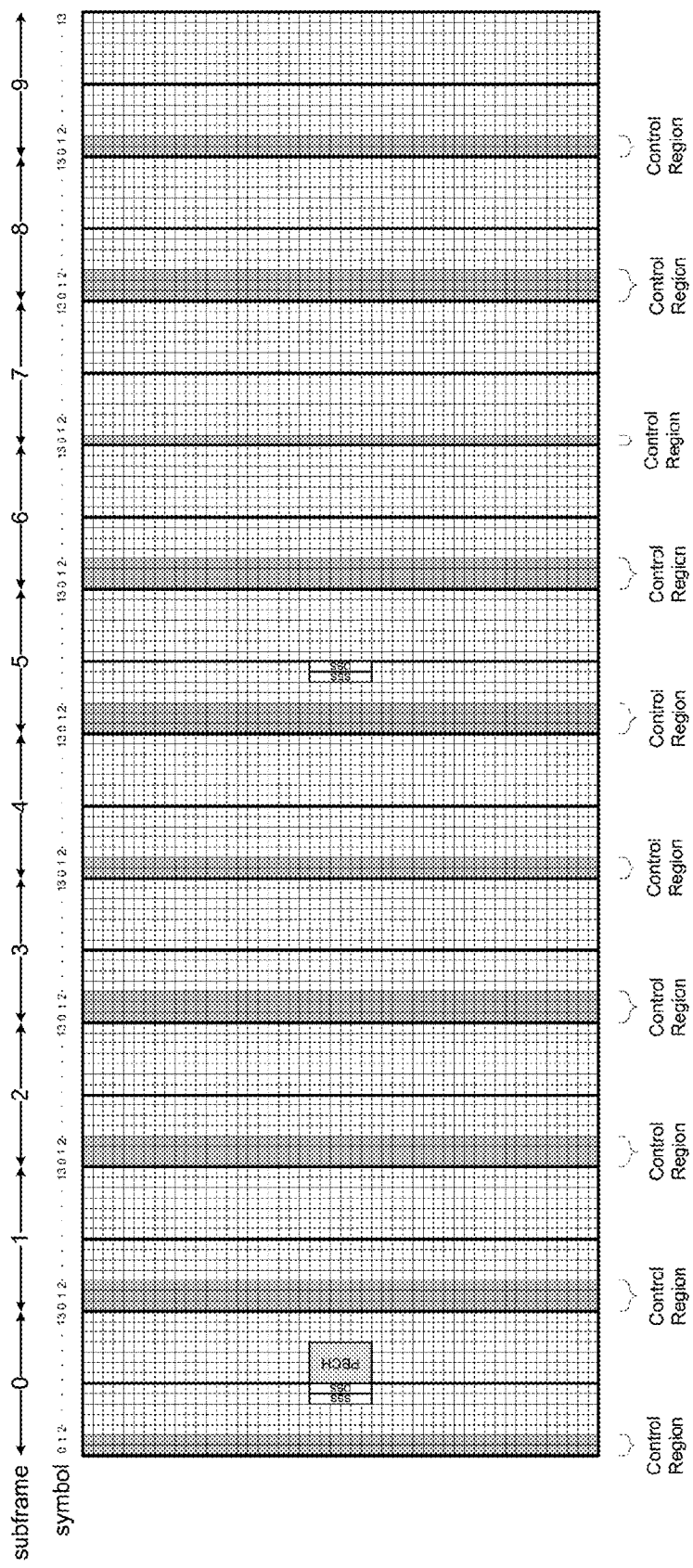
Figure 4:
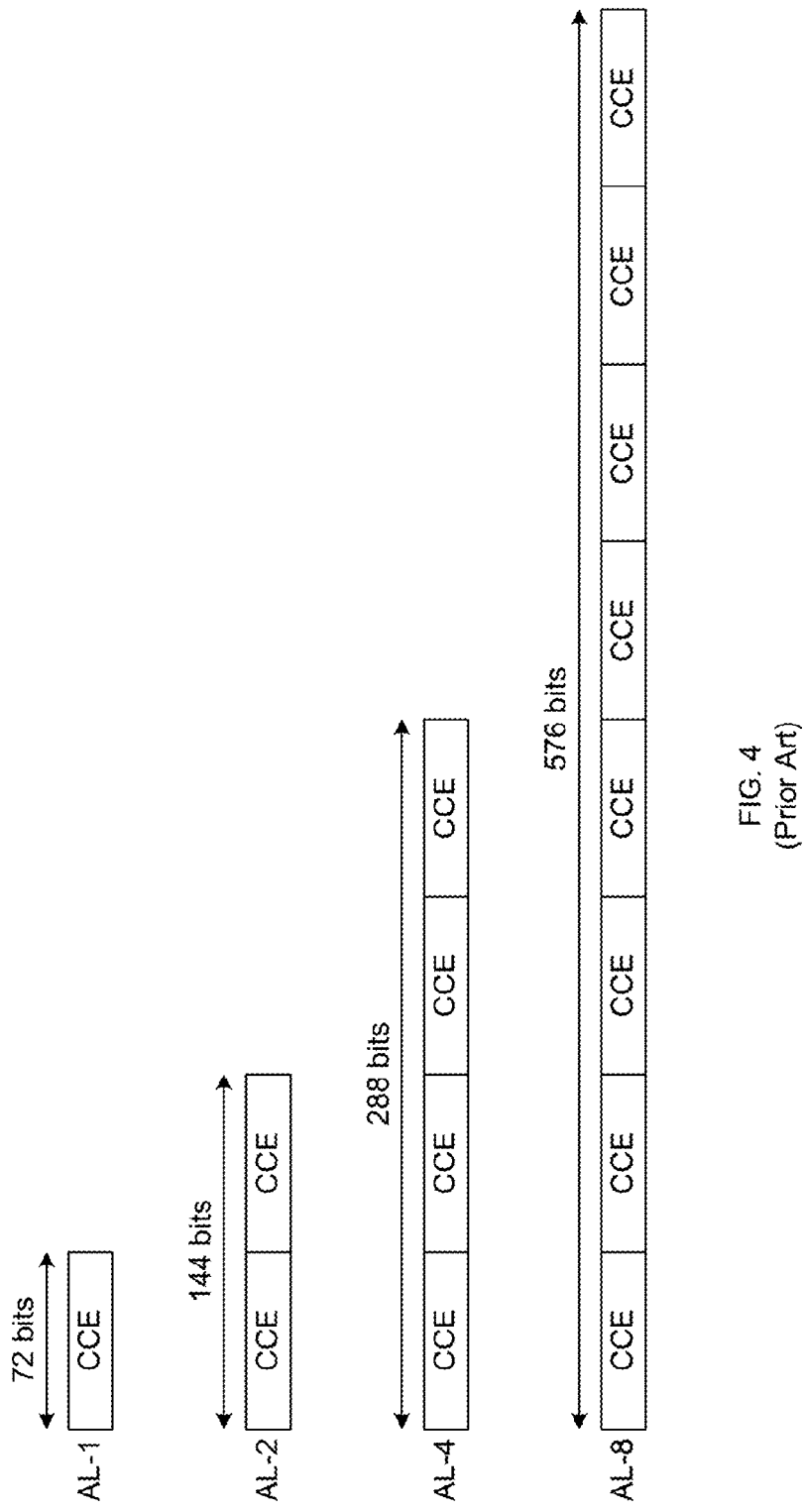
FIG. 4 illustrates different Aggregation Levels for PDCCH in LTE wireless communication system.
Figure 5:
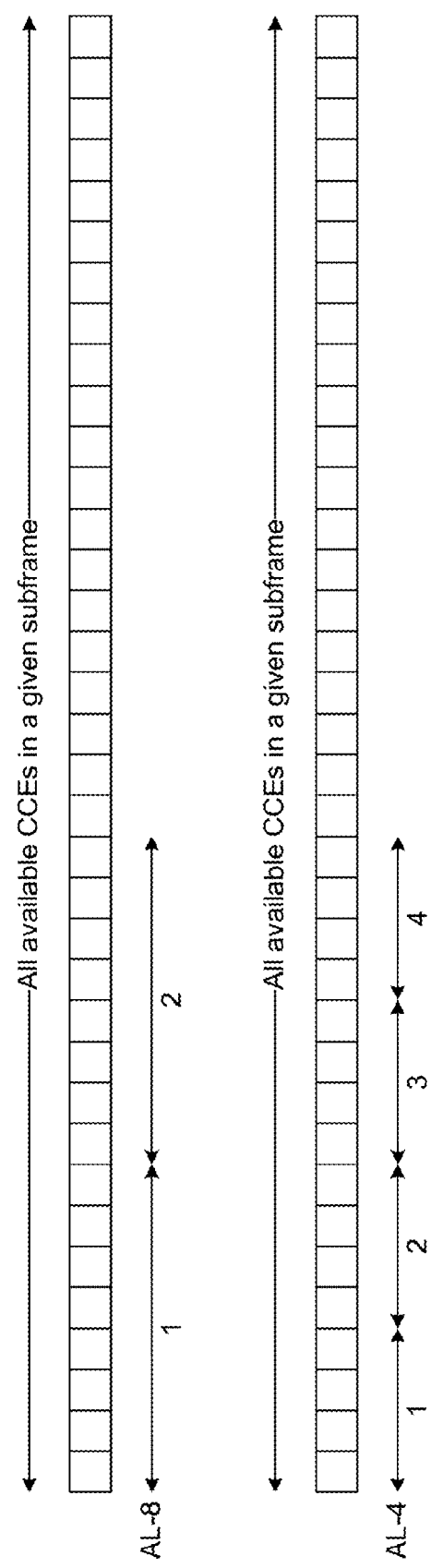
FIG. 5 illustrates PDCCH candidate mapping to CCEs for Common Search Space illustrates.
Figure 6:
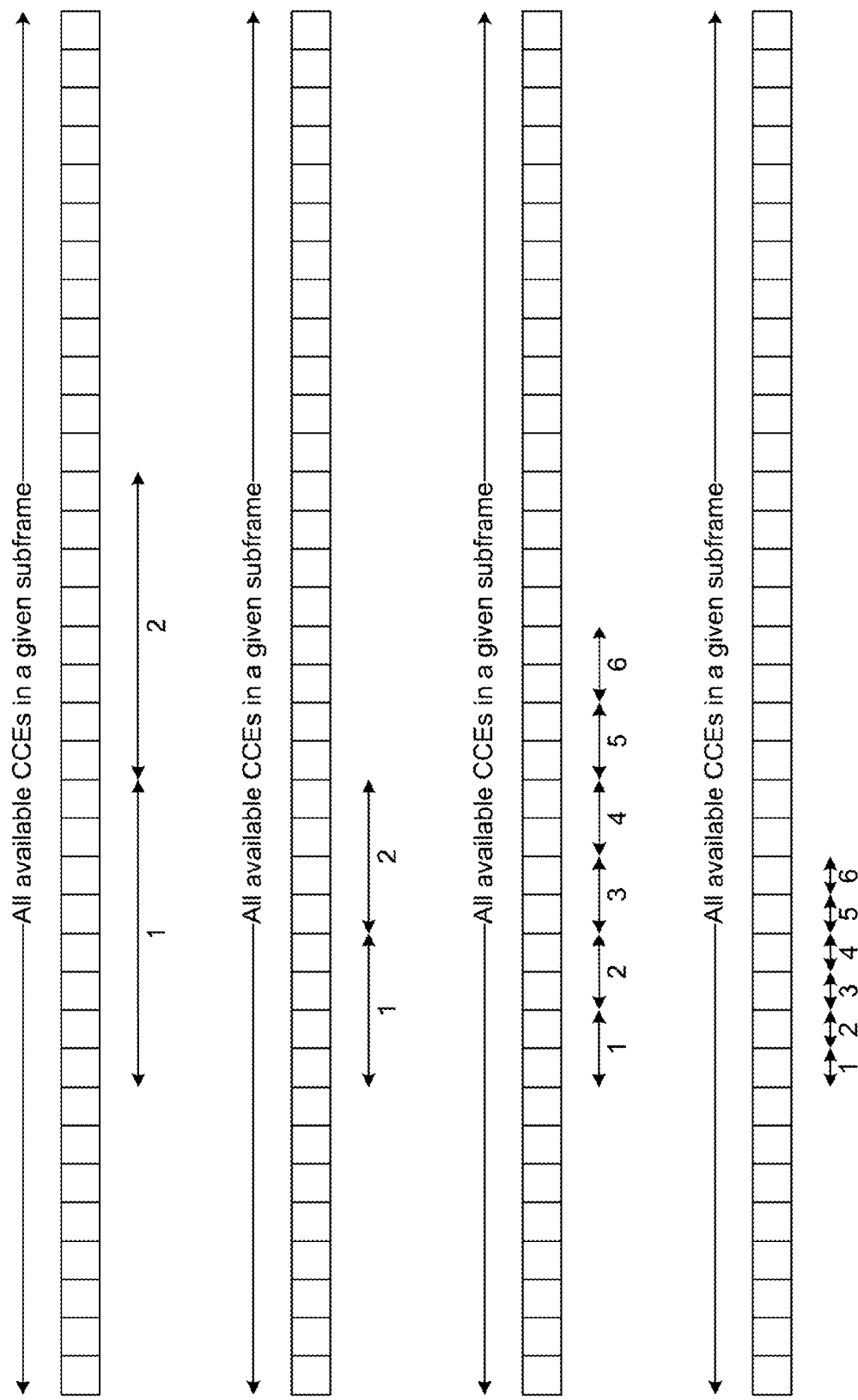
FIG. 6 illustrates PDCCH candidate mapping to CCEs for UE Specific Search Space.
Figure 8:
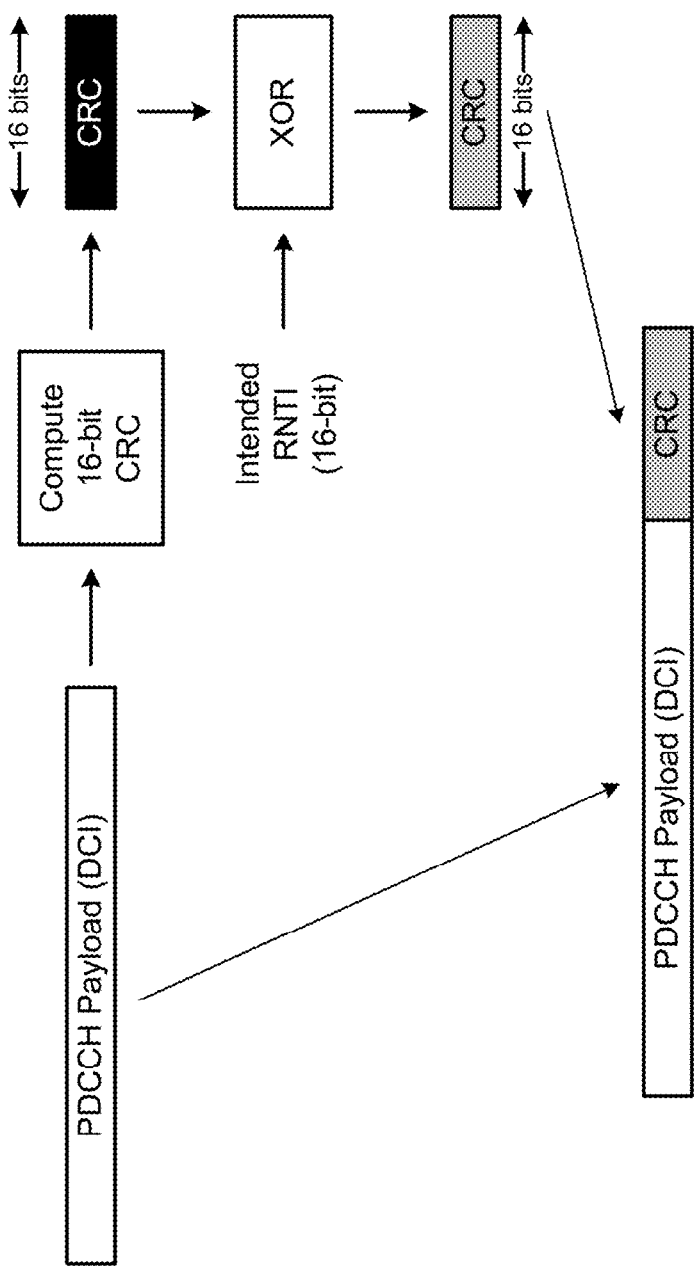
FIG. 8 illustrates the PDCCH CRC generation and XOR-ing with RNTI.

Methods and apparatus are described that reduce the probability of false PDCCH detection and duplicate PDCCH detection.

According to an aspect of the present invention, some false PDCCH detections may be identified by checking the content of the decoded message. The PDCCH carries payloads of different DCI messages. Each of the DCI messages is transmitted according to a specific format comprising a number of bit fields. The output of the PDCCH decoder is parsed for the expected format. In one scenario, the following list of checks is performed for identifying the false PDCCH detection:

Checks to be Performed to Avoid False PDCCH before DCI Data Parsing

1. Only one SI-RNTI based PDCCH or P-RNTI based PDCCH may be detected in a subframe.
2. Only one RA-RNTI or C-RNTI or SPS-C RNTI or Temp-C RNTI based PDSCH is allowed in a subframe.
3. Only one PUSCH grant (DCI Format 0) based on C-RNTI, SPS-C RNTI or Temp-C RNTI is allowed in a subframe. For TDD Configuration 0, at most two grants, based on C-RNTI, SPS-C RNTI or Temp-C RNTI, are allowed.
4. The protocol software is aware of the maximum number of successful PDCCHs to be expected in any given subframe. This information is used to limit the maximum number of blind PDCCH decoding attempts.
5. In a TDD configuration, some subframes may never carry a UL grant related DCI. In some TDD configurations, some subframes may never carry DL allocation related DCI. This information is controlled by limiting the number of decoded DCIS on a per subframe basis according to the table contained in FIG. 9.
   a. Maximum number of DL DCI matching with C-RNTI [possible values 0, 1]
   b. Maximum number of DL DCI matching with Temp-C RNTI [possible values 0, 1]
   c. Maximum number of UL DCI (DCI with Format 0) matching with C-RNTI [possible values are 0, 1, 2]. The value of 2 is only applicable in case of TDD duplexing scheme with TDD Configuration-0.
   d. Max DCI with Format 0 matching with Temp-C RNTI [possible values are 0, 1]
6. The client terminal may need to use multiple identities, i.e., RNTIs such as RA-RNTI, C-RNTI, SPS-C RNTI, Temp-C RNTI, SI-RNTI, and P-RNTI. The CRC is checked after XOR-ing the received CRC with only the expected RNTIs for any given subframe based on the a priori information and the information exchanged between the UE and eNB. For example, the timing of the transmission of subframes with SI-RNTIs is known to the UE partially before camping on to a cell and fully after camping on to a cell.
7. Some RNTIs are only valid when the client terminal is in certain modes. For example, the P-RNTI is valid only when the client terminal is not having an active data connection with the eNB. Therefore, the P-RNTI is enabled only when the client terminal does not have an active data connection with the eNB.
8. Broadcast messages can only be transmitted by the eNB in the common search of the blind PDCCH decoder. Therefore, any enabled broadcast RNTI (SI-RNTI, P-RNTI, RA-RNTI, Temp-C-RNTI) are used only when the decoded PDCCH candidate is from the CSS.
9. The LTE specifications 3GPP TS 36.302: "Evolved Universal Terrestrial Radio Access (E-UTRA); Services provided by the physical layer" defines a variety of Reception Types as shown in table contained in FIG. 10. False DCI can be detected based on DL Reception Type violations as follows:
   a. Only one SI-RNTI based DCI is allowed in "Reception Type-B"

b. Only one P-RNTI based DCI is allowed in "Reception Type-C"
c. Only one DCI from "Reception Type D/E/G/I" are allowed
d. Only one DCI from "Reception Type F/H/J" are allowed in FDD mode
e. One DCI from "Reception Type F/H/J" and one DCI from "Reception Type H/J" are allowed in TDD mode.

Figure 11A:
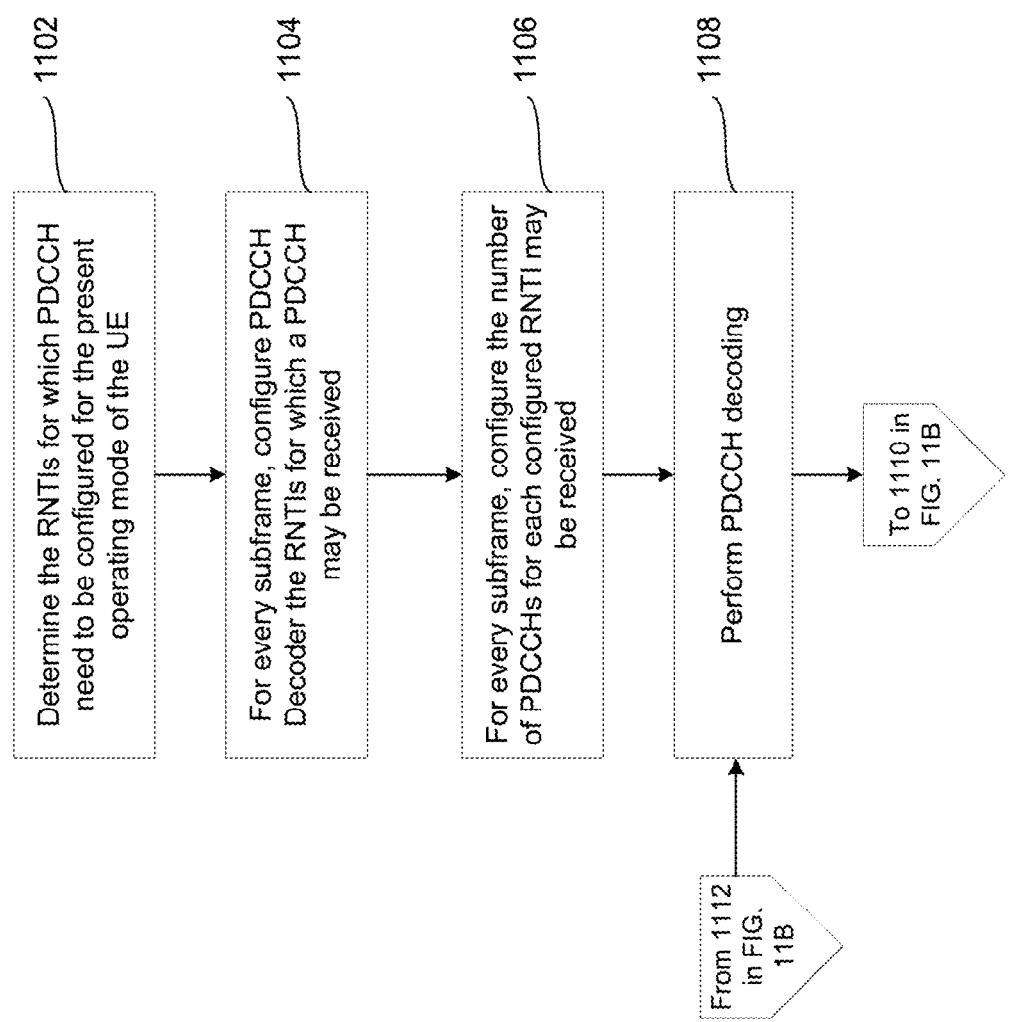
FIGS. 11A-B illustrate the false PDCCH decoding detection and avoidance according to an aspect of the present invention.
Figure 11B:
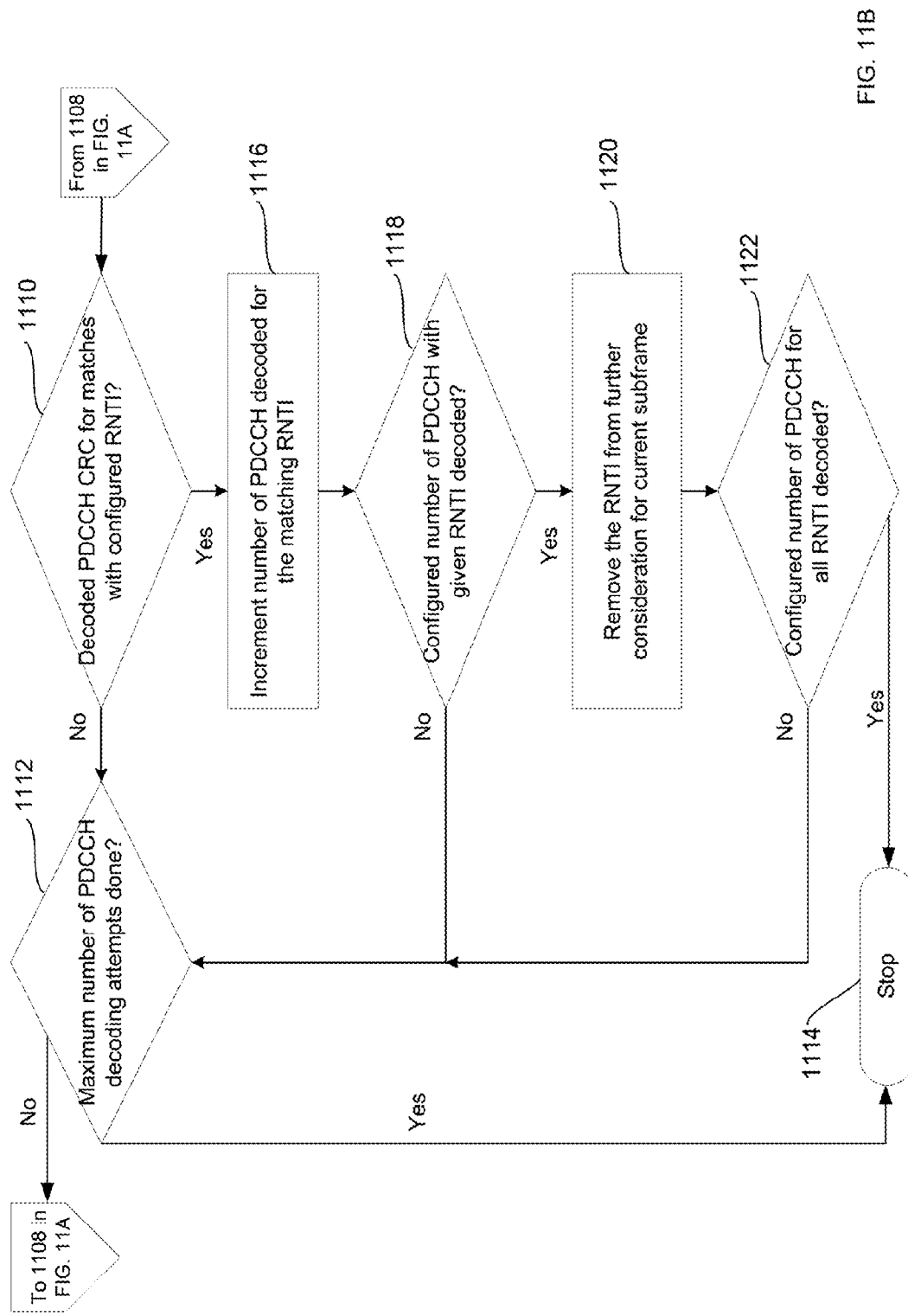

The flow diagram contained FIGS. 11A-B illustrate an example of the processing steps for checks to be performed for false DCI before DCI data parsing. The steps 1 through 9 described above are implemented at processing blocks 1102, 1104 and 1106 in FIG. 11A. The processing blocks 1110, 1112, 1114, 1116, 1118, 1120 and 1122 in FIG. 11B implement the checking of the received decoded PDCCH against the information generated by the blocks in FIG. 11A as per steps 1 to 9 paragraph.

For each subframe, a determination is made in block 1102 about the RNTIs for which PDCCH need to be performed for the present operating mode of the UE. This determination is made anew for every subframe. Once the determination is made in block 1102, the selected RNTIs are configured into the PDCCH decoder as shown in block 1104.

Next the number of PDCCHs to be received for each RNTI is configured to the PDCCH decoder as shown in block 1106. Next the PDCCH decoding is started as shown in block 1108. At this point a decision made in block 1110 as to whether the decoded PDCCH CRC matches with any of the configured RNTIs. If the PDCCH CRC does not match with any of the configured RNTIs, a decision is made in block 1112 whether to continue further PDCCH decoding. This decision is based on whether the maximum number of PDCCH decoding attempts has been completed or not. If the maximum number of PDCCH decoding attempts is completed, then the processing flow jumps to block 1114 and the PDCCH decoding for the given subframe stops at that point. If the maximum number of PDCCH decoding attempts is not completed, then the processing flow returns to block 1108.

Returning to block 1110, if the PDCCH CRC matches with one of the configured RNTIs, the number of PDCCH decoded for the matching RNTI is incremented in block 1116. At this point a check is performed in block 1118 to determine whether the configured number of PDCCHs for a given RNTI is decoded or not. If the configured number of PDCCHs for a given RNTI is not decoded yet, the processing flow returns to block 1112.

If the configured number of PDCCHs for a given RNTI is decoded, the RNTI for which the configured number of PDCCHs are decoded is removed from the list of configured RNTIs for the current subframe in block 1120 to eliminate it from further PDCCH decoding consideration.

Next a check is performed in block 1122 to determine whether a configured number of PDCCH for all configured RNTIs is received or not. If the configured number of PDCCH for all configured RNTIs is not received, the processing returns to block 1112. If the configured number of PDCCH for all configured RNTIs is not received, the processing returns to block 1112. If configured number of PDCCH for all configured RNTIs is received, the processing goes to block 1114 and the PDCCH decoding for the given subframe stops at that point.

Checks to be Done for False PDCCH after DCI Data Parsing

1. Duplicate DCI detection may be performed as follows:
   a. The aggregation levels (AL) are defined as trees structured such that the PDCCH candidates at lower aggregation level are subset of PDCCH candidates at higher aggregation level. If a PDCCH candidate is decoded successfully at a lower aggregation level, candidates at higher aggregation level within the same tree are skipped. This may avoid possible duplicate DCI detection. This step is implemented in block 1303 in FIG. 13A.
   b. Duplicate PDCCH detection may be performed by checking whether the message is identical to another successfully decoded message of the same length. Note that it is possible to have different messages of the same length; therefore comparing the length alone may not be sufficient. Block 1304 in FIG. 13A implements this step.
   c. Another method to avoid duplicate PDCCH detection is to check whether the CRC of a decoded PDCCH message is identical to the CRC of a previously decoded PDCCH. Block 1404 in FIG. 14A implements this step.
2. The number of HARQ processes for FDD mode is fixed to eight whereas it varies for TDD based on the configuration type as shown in table contained in FIG. 12. The DCIS with invalid HARQ Process Identity for a given TDD Configuration may be used to detect False DCI. This step is implemented in blocks 1308 and 1310 in FIG. 13A.
3. The New Data Indicator ("NDI") field value compared to previously received value for a given HARQ process must be consistent with the Modulation and Coding Scheme ("MCS") and Redundancy Version ("RV") fields of the DCI message. Specifically, the initial transmission must not use the MCS and RV values that correspond to retransmission. This step is implemented by the blocks 1312, 1314, 1316, 1318, 1320 and 1322 as shown in FIG. 13B.

Figure 13A:
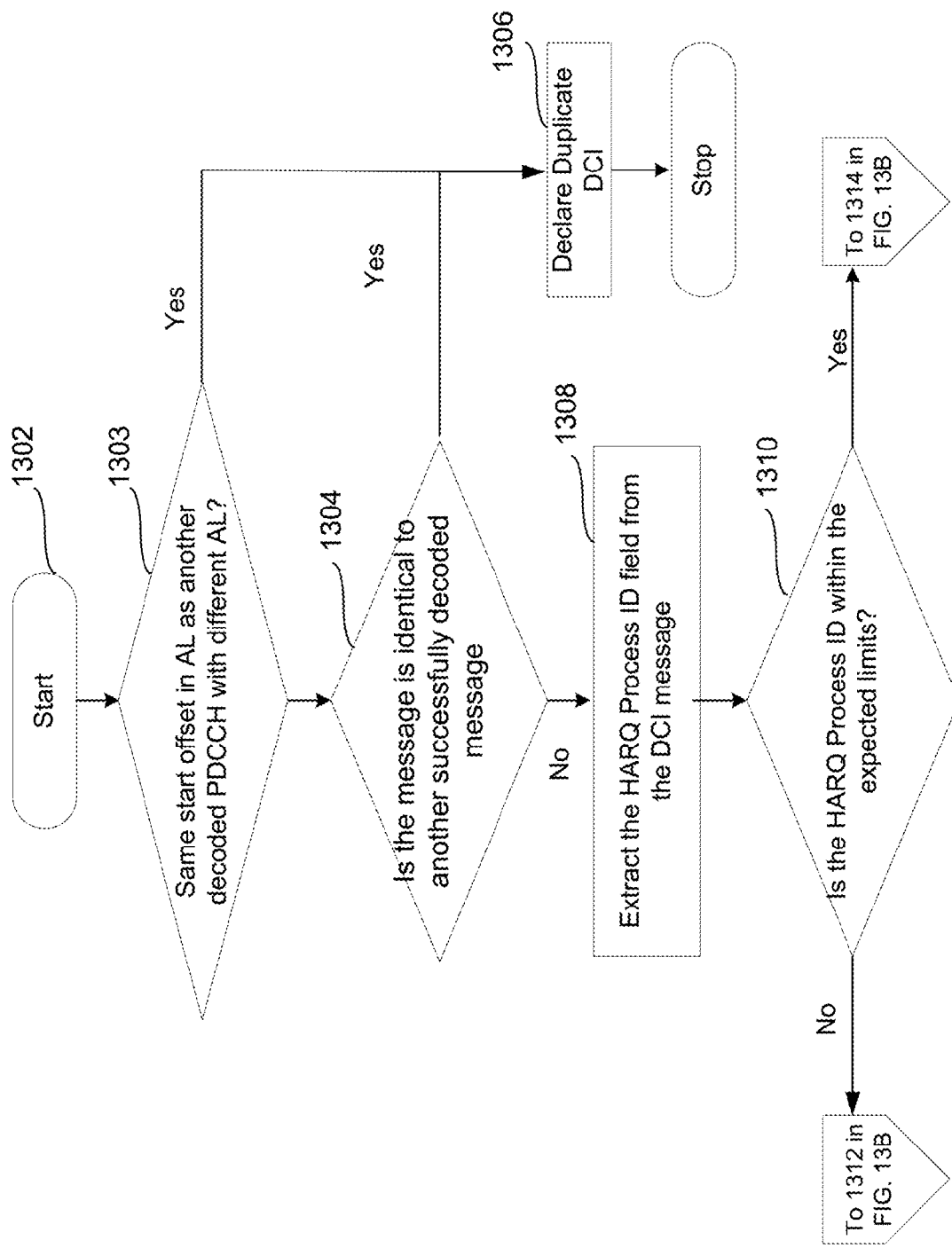
FIGS. 13A-B illustrate the parsing of DCI for detection and avoidance of false DCI according to an aspect of the present invention.
Figure 13B:
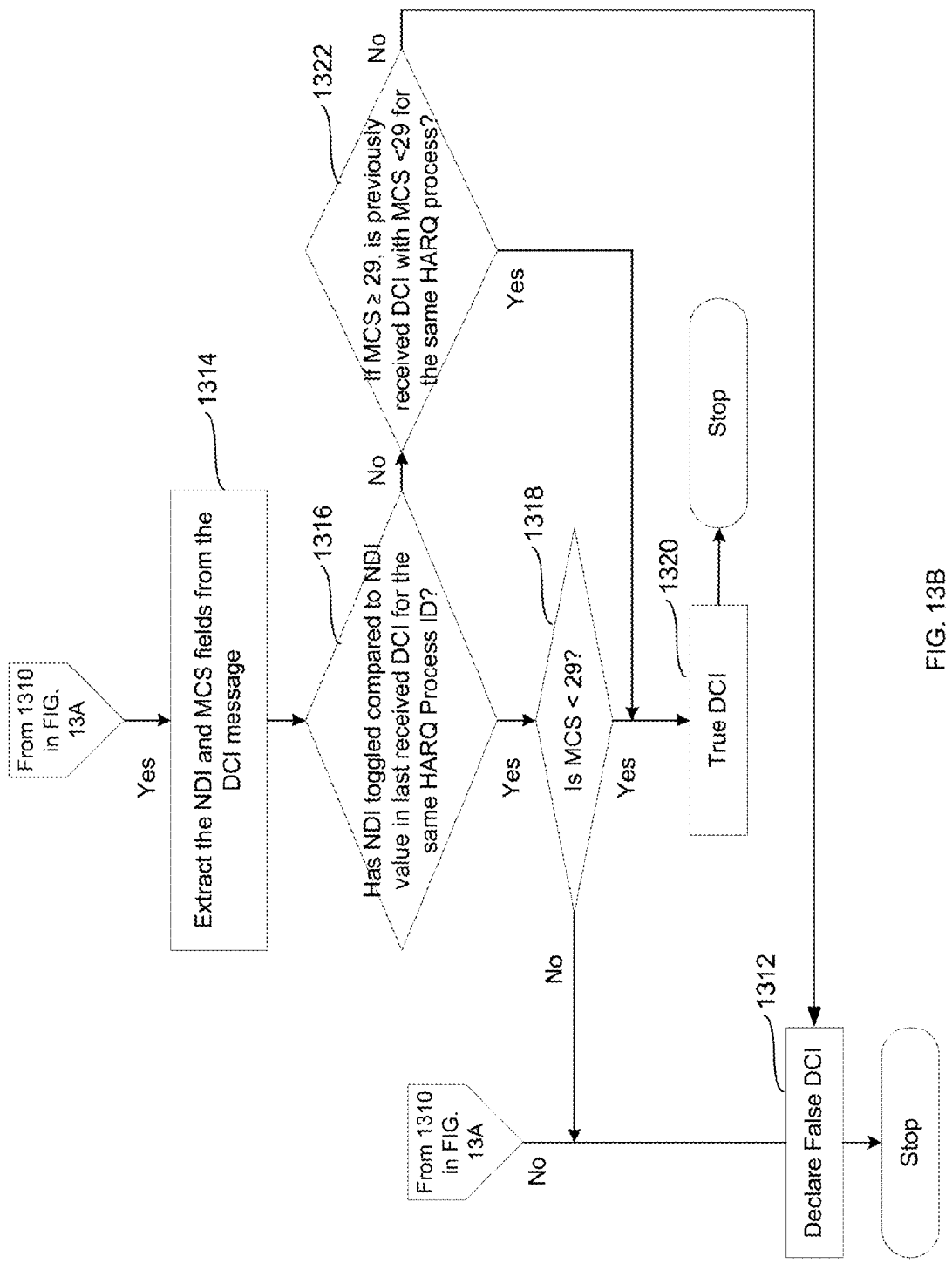

The flowchart contained in FIGS. 13A-B illustrates an example of the processing steps for checks to be performed for false DCI detection. The processing flow starts at block 1302.

In block 1304 a determination is made as to whether the decoded PDCCH CRC matches with any of the previously decoded PDCCH CRC. If the decoded PDCCH CRC matches with any of the previously decoded PDCCH CRC, then the processing jumps to block 1306 where the newly decoded PDCCH is determined to be duplicate of previously decoded PDCCH and it is discarded.

Returning to block 1304, if the decoded PDCCH CRC does not match with any of the previously decoded PDCCH CRC, the HARQ process ID field is extracted from the DCI payload from the decoded PDCCH. Next, in block 1310 a determination is made whether the extracted HARQ process ID is within the expected limits according to the table contained in FIG. 12.

If the extracted HARQ process ID is not within the expected limits according to the table contained in FIG. 12, the DCI is determined to be a false DCI in block 1312 and it is discarded. Returning to block 1310, if the extracted HARQ process ID is within the expected limits according to the table contained in FIG. 12, the processing continues in block 1314 where the NDI and MCS fields are extracted from the DCI message.

Next in block 1316, a determination is made whether the extracted NDI, which is a one bit field, has toggled compared to the NDI value in a last received DCI for the same HARQ Process ID. If the NDI value has toggled, in block 1318 the value of the MCS field is checked to determine whether it is less than 29 to ensure that the required information for a new transmission is available. If the MCS field is less than 29, the received DCI may be determined as true DCI in block 1320. If the MCS field is greater than or equal to 29, the received DCI may be determined as false DCI in block 1320. Returning to block 1316, if the NDI value has not toggled, a determination is made in block 1322 whether the extracted MCS≥29 and if so whether any DCI for the same HARQ process ID was previously received with MCS<29. If the extracted MCS≥29 and a DCI for the same HARQ process ID was previously received with MCS<29, the received DCI is determined to be a true DCI in block 1320. Otherwise, the received DCI is determined to be a false DCI in block 1312.

Figure 14A:
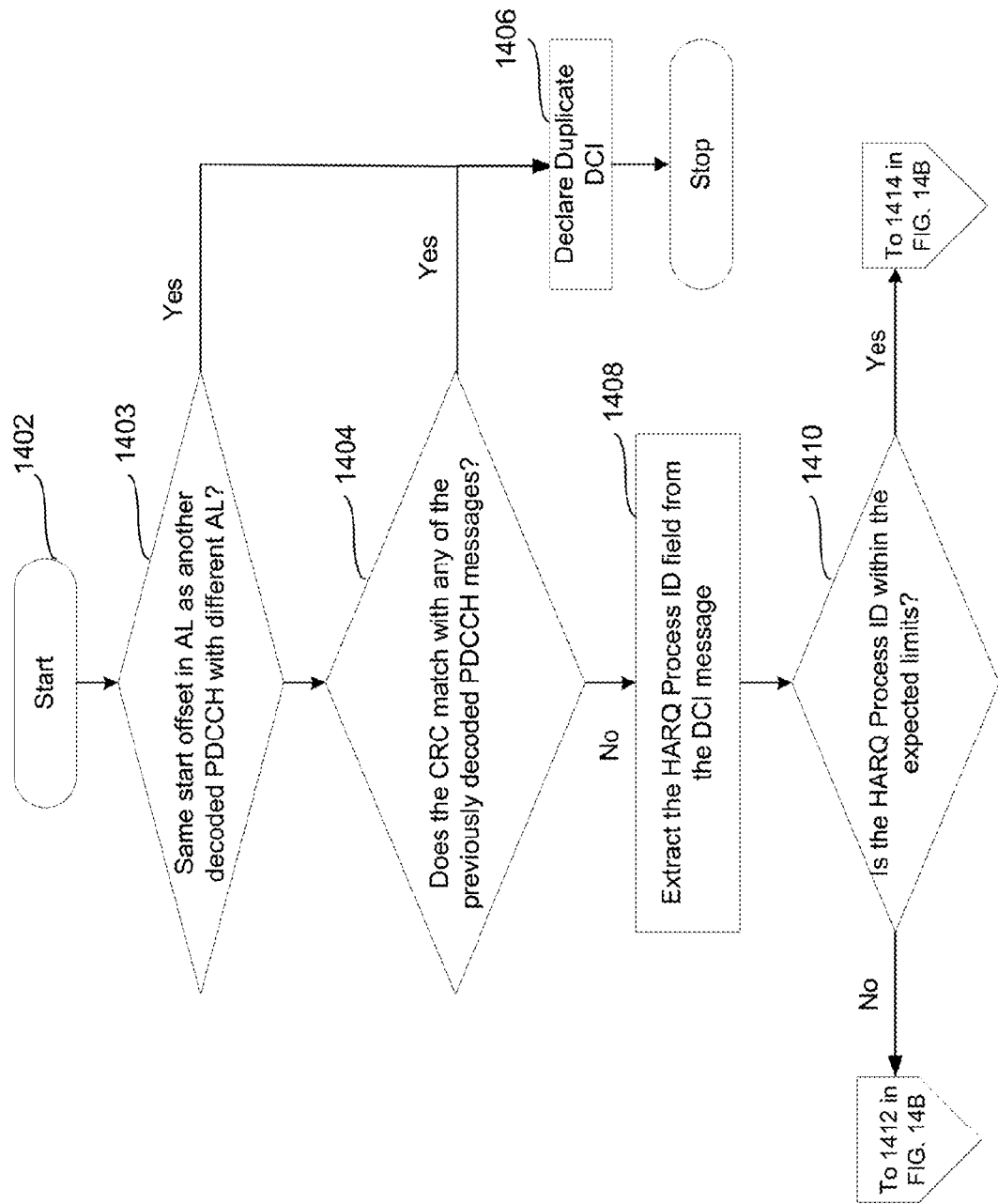
FIGS. 14A-B illustrate an example of checks to be performed for false DCI detection according to an aspect of the present invention.
Figure 14B:
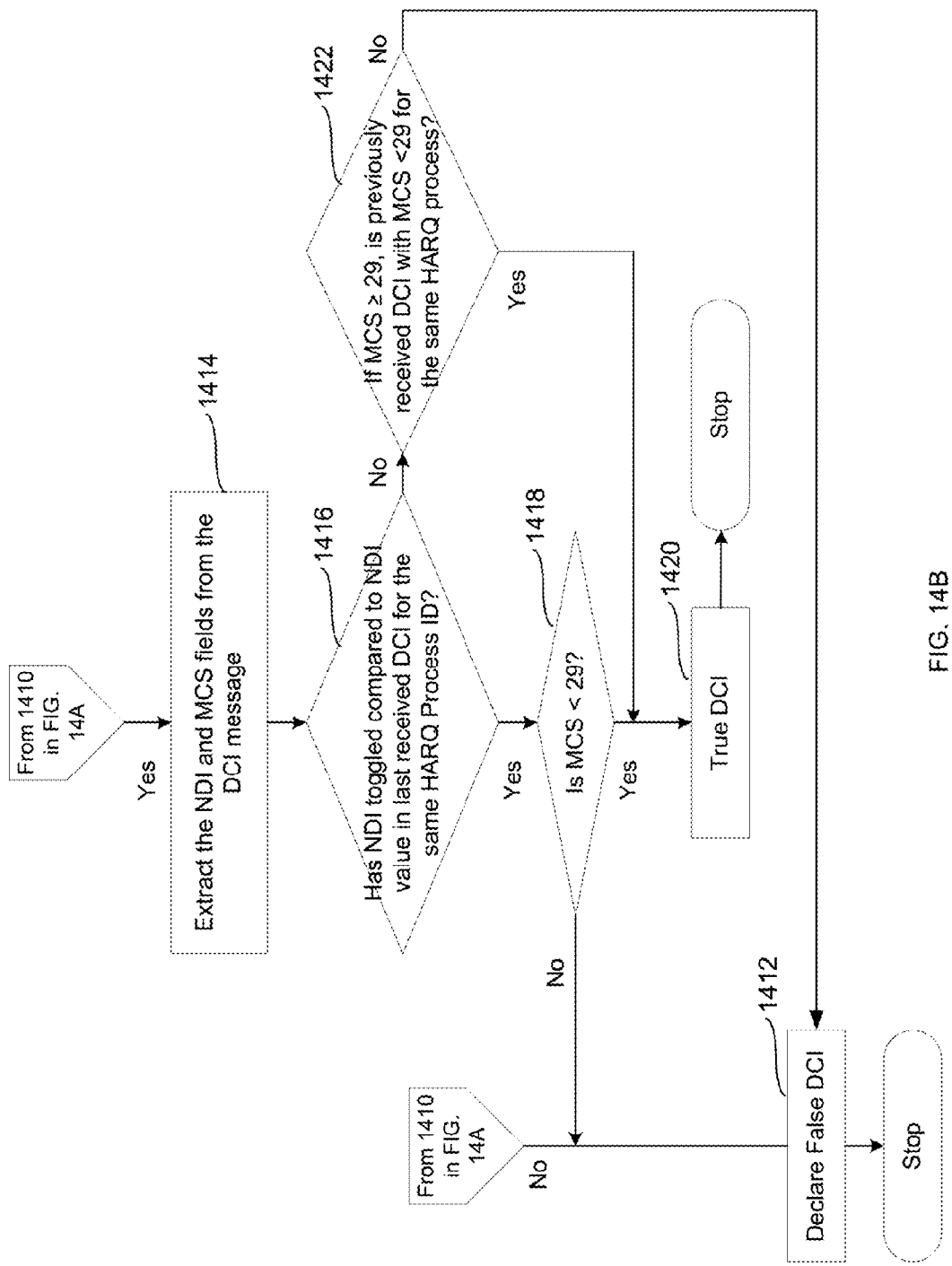

The flowchart contained in FIGS. 14A-B illustrates an example of the processing steps for checks to be performed for false DCI detection. The processing flow starts at block 1402 and follows similar processing steps as in FIGS. 13A-B, but the function of duplicate DCI detection block 1304 is achieved in block 1404 using an alternate method described in step 1c above.

The above methods can be used independently or jointly to reduce the false and duplicate PDCCH detection probability.

By way of example only, the above-described example methods may be implemented in a receiver, e.g., a user device such as a wireless mobile station ("MS") 12 as shown in FIG. 1.

As shown in FIG. 15, MS 100 may include a baseband subsystem 102 and a radio frequency ("RF") subsystem 104 for use with a wireless communication network. A display/user interface 106 provides information to and receives input from the user. By way of example, the user interface may include one or more actuators, a speaker and a microphone.

The baseband subsystem 102 and a RF subsystem 104 may be high speed serial communication devices communicating through the high speed communication link.

Figure 17:
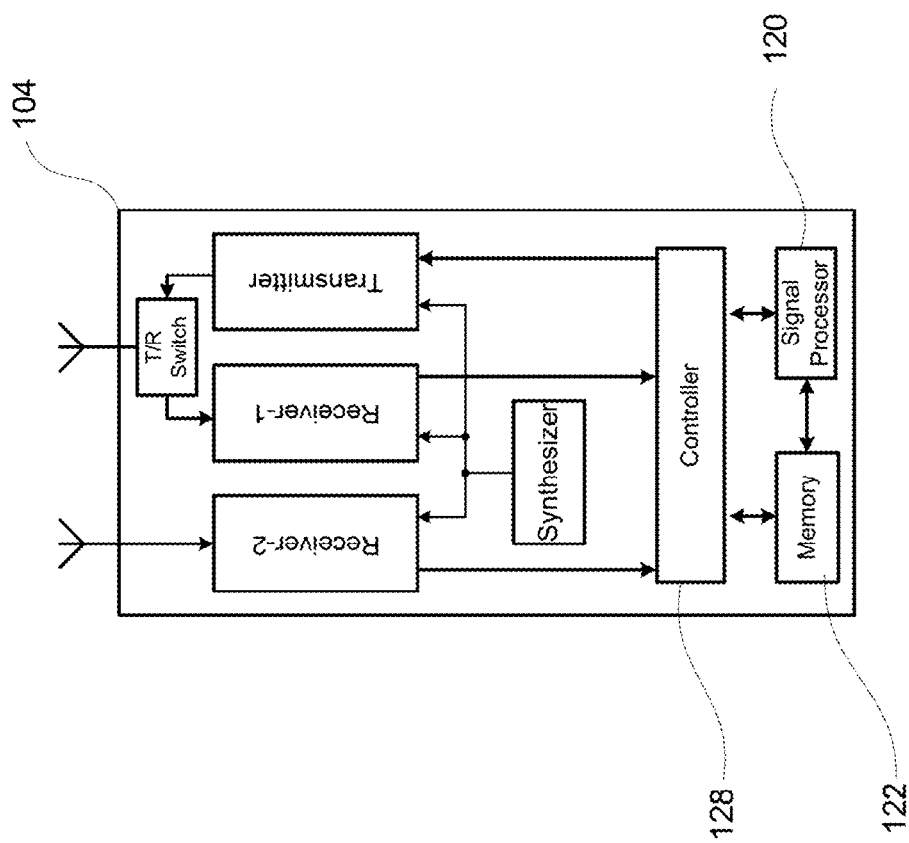
FIG. 17 illustrates an RF subsystem for a wireless mobile station diagram.

The baseband subsystem 102 as shown in FIG. 16 may include a controller 108 such as a microcontroller or other processor. The RF subsystem 104 as shown in FIG. 17 may include a controller 108 such as a microcontroller or other processor. The controller 108 desirably handles overall operation of the MS 100, including management of the RF subsystem 104. This may be done by software or firmware running on the controller 108. Such software/firmware may embody any methods in accordance with aspects of the present invention.

A signal processor 110 may be used to process samples from the RF subsystem 104 or other information sent or received by the MS 100. The signal processor 110 may be a stand-alone component or may be part of the controller 108. Memory 112 may be shared by or reserved solely for one or both of the controller 108 and the signal processor 110. For instance, signal processing algorithms may be stored in a non-volatile section of memory 112 while coefficients and other data parameters may be stored in RAM. Peripherals 114 such as a full or partial keyboard, video or still image display, audio interface, etc may be employed and managed through the controller 108.

The RF subsystem 104 preferably provides two-way communication operation. It may include one or more receivers/receive chains, a transmitter, a synthesizer, a power amplifier, and one or more antennas operatively coupled together to enable communication. The receive chain(s) is operable to receive signals from one or more channels in a wireless communication network. A signal processor 120 may be used to process samples from the baseband subsystem 102. The signal processor 120 may be a stand-alone component or may be part of the controller 128. Memory 122 may be shared by or reserved solely for one or both of the controller 128 and the signal processor 120. For instance, signal processing algorithms may be stored in a non-volatile section of memory 122 while coefficients and other data parameters may be stored in RAM.

Aspects of the present invention may be implemented in firmware of the signal processor 110 and/or the controller 108 of the baseband subsystem. In another alternative, aspects of the present invention may also be implemented as a combination of firmware and hardware of the baseband subsystem. For instance, a signal processing entity of any or all of the FIG. 16 may be implemented in firmware, hardware and/or software. It may be part of the baseband subsystem, the receiver subsystem or be associated with both subsystems. In one example, the controller 108 and/or the signal processor 110 may include or control the protocol entity circuitry. The software may reside in internal or external memory and any data may be stored in such memory. The hardware may be an application specific integrated circuit ("ASIC"), field programmable gate array ("FPGA"), discrete logic components or any combination of such devices. The terms controller and processor are used interchangeably herein.

Aspects of the present invention may also be implemented in firmware of the signal processor 120 and/or the controller 128 of the RF subsystem 104. In another alternative, aspects of the present invention may also be implemented as a combination of firmware and hardware of the RF subsystem. For instance, a signal processing entity of any or all of the FIG. 17 may be implemented in firmware, hardware and/or software. The software may reside in internal or external memory and any data may be stored in such memory. The hardware may be an ASIC, FPGA, discrete logic components or any combination of such devices.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

The invention claimed is:

1. A computer-implemented method of checking for false downlink control information in a wireless communication system, the method comprising:
    selecting one or more radio network temporary identifiers (RNTI) for which a physical downlink control channel (PDCCH) needs to be configured, based on an operating mode in which a client device is presently operating;
    for every subframe, configuring, by one or more processors, the one or more selected RNTI into a PDCCH decoder;
    for every subframe, configuring a number of PDCCHs to be received for each configured RNTI to the PDCCH decoder; and
    performing PDCCH decoding using the PDCCH decoder; and
    limiting a maximum number of blind PDCCH decoding attempts for a given selected RNTI, based on a result of a determination whether a predetermined maximum number of successful PDCCHs in any given subframe for the given selected RNTI is reached.

2. The method of claim 1, further comprising, after performing the PDCCH decoding, determining whether a cyclic redundancy check (CRC) of the decoded PDCCH matches any of the configured RNTI.

3. The method of claim 2, wherein, when the PDCCH CRC does not match with any of the configured RNTI, the method further comprises determining whether to continue further PDCCH decoding based on whether a maximum number of PDCCH decoding attempts has been completed.

4. The method of claim 2, wherein, when the PDCCH CRC matches with one of the configured RNTI, the method further comprises incrementing the number of PDCCH decoded for the matching RNTI.

5. The method of claim 4, further comprising:
determining whether the configured number of PDCCHs for a given RNTI is decoded or not;
when the configured number of PDCCHs for a given RNTI is not decoded yet, determining whether the maximum number of PDCCH decoding attempts has been completed; and
when the configured number of PDCCHs for a given RNTI is decoded, removing from the list of configured RNTIs for the current subframe the RNTI for which the configured number of PDCCHs are decoded.

6. A processing system configured to check for false downlink control information in a wireless communication network, the system comprising:
memory configured to store information associated with one or more radio network temporary identifiers (RNTI) and one or more physical downlink control channels (PDCCH); and
one or more processors configured to:
select one or more RNTI for which a PDCCH needs to be configured for a present operating mode of a client device;
for every subframe, configure the one or more selected RNTI into a PDCCH decoder;
for every subframe, configure a number of PDCCHs to be received for each configured RNTI to the PDCCH decoder;
perform PDCCH decoding using the PDCCH decoder; and
limit a maximum number of blind PDCCH decoding attempts for a given selected RNTI, based on a result of a determination whether a predetermined maximum number of successful PDCCHs in any given subframe for the given selected RNTI is reached.

7. The processing system of claim 6, wherein the one or more processors are further configured to:
determine whether a cyclic redundancy check (CRC) of the decoded PDCCH matches any of the configured RNTI;
when the PDCCH CRC does not match with any of the configured RNTI, determine whether to continue further PDCCH decoding based on whether a maximum number of PDCCH decoding attempts has been completed; and
when the PDCCH CRC matches with one of the configured RNTI, incrementing the number of PDCCH decoded for the matching RNTI.

8. The processing system of claim 7, wherein the one or more processors are further configured to:
determine whether the configured number of PDCCHs for a given RNTI is decoded or not;
when the configured number of PDCCHs for a given RNTI is not decoded yet, determine whether the maximum number of PDCCH decoding attempts has been completed; and
when the configured number of PDCCHs for a given RNTI is decoded, remove from the list of configured RNTIs for the current subframe the RNTI for which the configured number of PDCCHs are decoded.

9. A wireless communication device configured to check for false downlink control information in a wireless communication network, the device comprising:
a transceiver configured to receive downlink control information;
memory configured to store information associated with one or more radio network temporary identifiers (RNTI) and one or more physical downlink control channels (PDCCH);
a PDCCH decoder configured to perform PDCCH decoding; and
one or more processors operatively coupled to the transceiver, the memory and the PDCCH decoder, the one or more processors being configured to:
select one or more RNTI for which a PDCCH needs to be configured, based on an operating mode in which a client device is presently operating;
for every subframe, configure the one or more selected RNTI into the PDCCH decoder;
for every subframe, configure a number of PDCCHs to be received for each configured RNTI to the PDCCH decoder;
cause the PDCCH decoder to perform the PDCCH decoding; and
limit a maximum number of blind PDCCH decoding attempts for a given selected RNTI, based on a result of a determination whether a predetermined maximum number of successful PDCCHs in any given subframe for the given selected RNTI is reached.

* * * * *